US00RE44636E

(19) United States
(12) Reissued Patent
Caillat

(10) Patent Number: US RE44,636 E
(45) Date of Reissued Patent: Dec. 10, 2013

(54) COMPRESSOR CAPACITY MODULATION

(75) Inventor: Jean-Luc Caillat, Dayton, OH (US)

(73) Assignee: Emerson Climate Technologies, Inc., Sidney, OH (US)

(21) Appl. No.: 11/152,836

(22) Filed: Jun. 15, 2005

Related U.S. Patent Documents

Reissue of:
(64) Patent No.: 6,206,652
Issued: Mar. 27, 2001
Appl. No.: 09/139,865
Filed: Aug. 25, 1998

U.S. Applications:
(63) Continuation-in-part of application No. 08/939,779, filed on Sep. 29, 1997, now Pat. No. 6,047,557.

(51) Int. Cl.
*F04B 49/00* (2006.01)

(52) U.S. Cl.
USPC ..... 417/298; 417/222.1

(58) Field of Classification Search
None
See application file for complete search history.

(56) References Cited

U.S. PATENT DOCUMENTS

| | | | |
|---|---|---|---|
| 878,562 | A | 2/1908 | Reeve |
| 1,394,802 | A | 10/1921 | Wineman |
| 1,408,943 | A | 3/1922 | Holdsworth |
| 1,584,032 | A | 5/1926 | Hoffman |
| 1,716,533 | A | 6/1929 | Redfield |
| 1,796,796 | A | 3/1931 | LeValley |
| 1,798,435 | A | 3/1931 | Saharoff |
| 1,878,326 | A | 9/1932 | Ricardo |
| 1,984,171 | A | 12/1934 | Baker |
| 2,134,834 | A | 11/1938 | Nordberg |
| 2,134,835 | A | 11/1938 | Nordberg |
| 2,171,286 | A | 8/1939 | Baker |
| 2,185,473 | A | 1/1940 | Neeson |
| 2,206,115 | A | 7/1940 | Obreiter, Jr. |
| 2,302,847 | A | 11/1942 | Ferguson |
| 2,304,999 | A | 12/1942 | Gonzalez |

(Continued)

FOREIGN PATENT DOCUMENTS

| | | | |
|---|---|---|---|
| CA | 1135368 | A1 | 11/1982 |
| CN | 1042406 | A | 5/1990 |

(Continued)

OTHER PUBLICATIONS

Office Action for Chinese Patent Application No. 99108654.6 dated Jul. 26, 2002, 7 pp (English Translation).

(Continued)

*Primary Examiner* — Thor Campbell
(74) *Attorney, Agent, or Firm* — Harness, Dickey & Pierce, P.L.C.

(57) ABSTRACT

A pulsed modulated capacity modulation system for refrigeration, air conditioning or other types of compressors is disclosed in which suitable valving is provided which operates to cyclically block flow of suction gas to a compressor. A control system is provided which is adapted to control both the frequency of cycling as well as the relative duration of the on and off time periods of each cycle in accordance with sensed system operating conditions so as to maximize the efficiency of the system. Preferably the cycle time will be substantially less than the time constant of the load and will enable substantially continuously variable capacity modulation from substantially zero capacity to the full capacity of the compressor. Additional controls may be incorporated to modify one or more of the motor operating parameters to improve the efficiency of the motor during periods of reduced load.

11 Claims, 6 Drawing Sheets

(56) References Cited

U.S. PATENT DOCUMENTS 2,346,987 A 4/1944 Newton
2,369,841 A 2/1945 Neeson
2,412,503 A 12/1946 Gerteis
2,421,872 A 6/1947 Evelyn
2,423,677 A 7/1947 Balogh
2,470,380 A 5/1949 Turnwald
2,546,613 A 3/1951 Paget
2,602,582 A 7/1952 Garbaccio
2,626,099 A 1/1953 Ashley
2,626,100 A 1/1953 McIntyre
2,738,659 A 3/1956 Heed
2,801,827 A 8/1957 Dolza
2,982,467 A 5/1961 Corson et al.
3,303,988 A 2/1967 Weatherhead
3,578,883 A 5/1971 Cheney
3,653,783 A 4/1972 Sauder
3,732,036 A 5/1973 Busbey et al.
3,759,057 A 9/1973 English et al.
3,790,310 A 2/1974 Whelan
RE29,283 E 6/1977 Shaw
RE29,621 E 5/1978 Conley et al.
4,105,371 A 8/1978 Savage et al.
4,112,703 A 9/1978 Kountz
4,132,086 A 1/1979 Kountz
4,149,827 A 4/1979 Hofmann, Jr.
4,152,902 A 5/1979 Lush
4,184,341 A 1/1980 Friedman
4,220,197 A 9/1980 Schaefer et al.
4,227,862 A 10/1980 Andrew et al.
4,231,713 A 11/1980 Widdowson et al.
4,249,866 A 2/1981 Shaw et al.
4,267,702 A 5/1981 Houk
4,336,001 A 6/1982 Andrew et al.
4,361,417 A 11/1982 Suzuki
4,362,475 A 12/1982 Seitz
4,370,103 A 1/1983 Tripp
4,384,462 A 5/1983 Overman et al.
4,396,345 A 8/1983 Hutchinson
4,406,589 A 9/1983 Tsuchida et al.
4,407,639 A 10/1983 Maruyama
4,419,866 A 12/1983 Howland
4,432,705 A 2/1984 Fraser et al.
4,437,317 A 3/1984 Ibrahim
4,442,680 A 4/1984 Barbier et al.
4,447,193 A 5/1984 Bunn et al.
4,447,196 A 5/1984 Nagasaku et al.
4,452,571 A 6/1984 Koda et al.
4,459,817 A 7/1984 Inagaki et al.
4,463,573 A 8/1984 Zeno et al.
4,463,576 A 8/1984 Burnett et al.
4,471,938 A 9/1984 Schwarz
4,481,784 A 11/1984 Elmslie
4,494,383 A 1/1985 Nagatomo et al.
4,506,517 A 3/1985 Pandzik
4,506,518 A 3/1985 Yoshikawa et al.
4,507,936 A 4/1985 Yoshino
4,522,568 A 6/1985 Gelse et al.
4,575,318 A 3/1986 Blain
4,580,947 A 4/1986 Shibata et al.
4,580,949 A 4/1986 Maruyama et al.
4,588,359 A 5/1986 Hikade
4,610,610 A 9/1986 Blain
4,612,776 A 9/1986 Alsenz
4,632,145 A 12/1986 Machu
4,632,358 A 12/1986 Orth et al.
4,634,046 A 1/1987 Tanaka
4,638,973 A 1/1987 Torrence
4,651,535 A 3/1987 Alsenz
4,655,689 A 4/1987 Westveer et al.
4,663,725 A 5/1987 Johnson et al.
4,669,272 A 6/1987 Kawai et al.
4,685,309 A 8/1987 Behr
4,697,421 A 10/1987 Otobe et al.
4,697,431 A 10/1987 Alsenz
4,715,792 A 12/1987 Nishizawa et al.
4,723,895 A 2/1988 Hayase
4,726,740 A 2/1988 Suzuki et al.
4,727,725 A 3/1988 Nagata et al.
4,737,080 A 4/1988 Owsley et al.
4,743,168 A 5/1988 Yannascoli
4,744,733 A 5/1988 Terauchi et al.
4,747,756 A 5/1988 Sato et al.
4,756,166 A 7/1988 Tomasov
4,764,096 A 8/1988 Sawai et al.
4,789,025 A 12/1988 Brandemuehl et al.
4,794,759 A 1/1989 Lyon
4,831,832 A 5/1989 Alsenz
4,838,766 A 6/1989 Kimura et al.
4,843,834 A 7/1989 Inoue et al.
4,848,101 A 7/1989 Suzuki
4,856,291 A 8/1989 Takahashi
4,860,549 A 8/1989 Murayama
4,869,289 A 9/1989 Hrabal
4,869,291 A 9/1989 Hrabal
4,875,341 A 10/1989 Brandemuehl et al.
4,878,818 A 11/1989 Shaw
4,880,356 A 11/1989 Suzuki et al.
4,892,466 A 1/1990 Taguchi et al.
4,893,480 A 1/1990 Matsui et al.
4,896,860 A 1/1990 Malone et al.
4,909,043 A 3/1990 Masauji et al.
4,910,968 A 3/1990 Yamashita et al.
4,926,652 A 5/1990 Kitamoto
4,932,220 A 6/1990 Inoue
4,932,632 A 6/1990 Nicol
4,934,157 A 6/1990 Suzuki et al.
4,938,684 A 7/1990 Karl et al.
4,946,350 A 8/1990 Suzuki et al.
4,951,475 A 8/1990 Alsenz
4,962,648 A 10/1990 Takizawa et al.
4,968,221 A 11/1990 Noll
4,974,427 A 12/1990 Diab
5,006,045 A 4/1991 Shimoda et al.
5,007,247 A 4/1991 Danig
5,009,074 A 4/1991 Goubeaux et al.
5,015,155 A 5/1991 Brown
5,018,366 A 5/1991 Tanaka et al.
5,022,234 A 6/1991 Goubeaux et al.
5,025,636 A 6/1991 Terauchi
5,027,612 A 7/1991 Terauchi
5,035,119 A 7/1991 Alsenz
5,052,899 A 10/1991 Peterson
5,056,990 A 10/1991 Nakajima
5,059,098 A 10/1991 Suzuki et al.
5,065,750 A 11/1991 Maxwell
5,067,326 A 11/1991 Alsenz
5,079,929 A 1/1992 Alsenz
5,088,297 A 2/1992 Maruyama et al.
5,094,085 A 3/1992 Irino
5,115,644 A 5/1992 Alsenz
5,129,791 A 7/1992 Nakajima
5,156,013 A 10/1992 Arima et al.
5,163,301 A 11/1992 Cahill-O'Brien et al.
5,189,886 A 3/1993 Terauchi
5,190,446 A 3/1993 Salter et al.
5,191,643 A 3/1993 Alsenz
5,191,768 A 3/1993 Fujii
5,199,855 A 4/1993 Nakajima et al.
5,203,179 A 4/1993 Powell
5,211,026 A 5/1993 Linnert
5,226,472 A 7/1993 Benevelli et al.
5,228,301 A 7/1993 Sjoholm et al.
5,241,833 A 9/1993 Ohkoshi
5,243,827 A 9/1993 Hagita et al.
5,243,829 A 9/1993 Bessler
5,244,357 A 9/1993 Bauer
5,247,989 A 9/1993 Benevelli
5,253,482 A 10/1993 Murway
5,259,210 A 11/1993 Ohya et al.
5,263,333 A 11/1993 Kubo et al.
5,265,434 A 11/1993 Alsenz
5,282,329 A 2/1994 Teranishi
5,282,729 A 2/1994 Swain
5,285,652 A 2/1994 Day

(56) References Cited

U.S. PATENT DOCUMENTS

| | | | |
|---|---|---|---|
| 5,319,943 | A | 6/1994 | Bahel et al. |
| 5,342,186 | A | 8/1994 | Swain |
| 5,363,649 | A | 11/1994 | McBurnett et al. |
| 5,381,669 | A | 1/1995 | Bahel et al. |
| 5,388,968 | A | 2/1995 | Wood et al. |
| 5,392,612 | A | 2/1995 | Alsenz |
| 5,396,780 | A | 3/1995 | Bendtsen |
| 5,400,609 | A | 3/1995 | Sjoholm et al. |
| 5,415,005 | A | 5/1995 | Sterber et al. |
| 5,415,008 | A | 5/1995 | Bessler |
| 5,425,246 | A | 6/1995 | Bessler |
| 5,426,952 | A | 6/1995 | Bessler |
| 5,431,026 | A | 7/1995 | Jaster |
| 5,435,145 | A | 7/1995 | Jaster |
| 5,438,844 | A | 8/1995 | Tuten, III et al. |
| 5,440,891 | A | 8/1995 | Hindmon, Jr. et al. |
| 5,440,894 | A | 8/1995 | Schaeffer et al. |
| 5,447,420 | A | 9/1995 | Caillat et al. |
| 5,463,876 | A | 11/1995 | Bessler et al. |
| 5,492,450 | A | 2/1996 | Bearint et al. |
| 5,493,867 | A | 2/1996 | Szynal et al. |
| 5,502,970 | A | 4/1996 | Rajendran |
| 5,507,316 | A | 4/1996 | Meyer |
| 5,515,267 | A | 5/1996 | Alsenz |
| 5,533,873 | A | 7/1996 | Kindl |
| 5,540,061 | A | 7/1996 | Gommori et al. |
| 5,540,558 | A | 7/1996 | Harden et al. |
| 5,546,756 | A | 8/1996 | Ali |
| 5,562,426 | A | 10/1996 | Watanabe et al. |
| 5,572,879 | A | 11/1996 | Harrington et al. |
| 5,591,014 | A | 1/1997 | Wallis et al. |
| 5,600,961 | A | 2/1997 | Whipple, III |
| 5,611,674 | A | 3/1997 | Bass et al. |
| 5,613,841 | A | 3/1997 | Bass et al. |
| 5,634,350 | A | 6/1997 | De Medio |
| 5,642,989 | A | 7/1997 | Keddie |
| 5,688,111 | A | 11/1997 | Takai |
| 5,713,724 | A | 2/1998 | Centers et al. |
| 5,735,134 | A | 4/1998 | Liu et al. |
| 5,741,120 | A | 4/1998 | Bass et al. |
| 5,762,483 | A | 6/1998 | Lifson et al. |
| 5,765,391 | A | 6/1998 | Lee et al. |
| 5,785,081 | A | 7/1998 | Krawczyk et al. |
| 5,807,081 | A | 9/1998 | Schutte et al. |
| 5,816,055 | A | 10/1998 | Ohman |
| 5,855,475 | A | 1/1999 | Fujio et al. |
| 5,865,604 | A | 2/1999 | Kawaguchi et al. |
| 5,947,701 | A | 9/1999 | Hugenroth |
| 5,967,761 | A | 10/1999 | Mehaffey |
| 6,026,587 | A | 2/2000 | Cunkelman et al. |
| 6,042,344 | A | 3/2000 | Lifson |
| 6,047,556 | A | 4/2000 | Lifson |
| 6,047,557 | A | 4/2000 | Pham et al. |
| 6,077,051 | A | 6/2000 | Centers et al. |
| 6,086,335 | A | 7/2000 | Bass et al. |
| 6,148,632 | A | 11/2000 | Kishita et al. |
| 6,206,652 | B1 | 3/2001 | Caillat |
| 6,213,731 | B1 | 4/2001 | Doepker et al. |
| 6,238,188 | B1 | 5/2001 | Lifson |
| 6,257,848 | B1 | 7/2001 | Terauchi |
| 6,361,288 | B1 | 3/2002 | Sperry |
| 6,393,852 | B2 | 5/2002 | Pham et al. |
| 6,401,472 | B2 | 6/2002 | Pollrich et al. |
| 6,408,635 | B1 | 6/2002 | Pham et al. |
| 6,431,210 | B1 | 8/2002 | Lowe et al. |
| 6,438,974 | B1 | 8/2002 | Pham et al. |
| 6,449,972 | B2 | 9/2002 | Pham et al. |
| 6,467,280 | B2 | 10/2002 | Pham et al. |
| 6,499,305 | B2 | 12/2002 | Pham et al. |
| 6,517,332 | B1 | 2/2003 | Lifson et al. |
| 6,575,710 | B2 | 6/2003 | Wallis |
| 6,619,934 | B2 | 9/2003 | Loprete et al. |
| 6,662,578 | B2 | 12/2003 | Pham et al. |
| 6,662,583 | B2 | 12/2003 | Pham et al. |
| 6,679,072 | B2 | 1/2004 | Pham et al. |
| 6,715,999 | B2 | 4/2004 | Ancel et al. |
| 6,868,685 | B2 | 3/2005 | Kim |
| 6,971,861 | B2 | 12/2005 | Black et al. |
| 7,331,767 | B2 | 2/2008 | Spiegl et al. |
| RE40,400 | E | 6/2008 | Bass et al. |
| 7,389,649 | B2 | 6/2008 | Pham et al. |
| 7,419,365 | B2 | 9/2008 | Pham et al. |
| RE40,554 | E | 10/2008 | Bass et al. |
| RE40,830 | E | 7/2009 | Caillat |
| 7,654,098 | B2 | 2/2010 | Pham et al. |
| 7,819,131 | B2 | 10/2010 | Walpole |
| 2001/0001463 | A1 | 5/2001 | Hayasaki et al. |
| 2001/0003573 | A1 | 6/2001 | Kimura et al. |
| 2001/0011463 | A1 | 8/2001 | Pollrich et al. |
| 2001/0031207 | A1 | 10/2001 | Maeda et al. |
| 2002/0182087 | A1 | 12/2002 | Okii et al. |
| 2002/0195151 | A1 | 12/2002 | Erickson et al. |
| 2003/0070441 | A1 | 4/2003 | Moon et al. |
| 2004/0079096 | A1 | 4/2004 | Itoh et al. |
| 2004/0093881 | A1 | 5/2004 | Kim |
| 2004/0231348 | A1 | 11/2004 | Murase et al. |
| 2006/0218959 | A1 | 10/2006 | Sandkoetter |
| 2007/0022771 | A1 | 2/2007 | Pham et al. |
| 2008/0131297 | A1 | 6/2008 | Hibino et al. |

FOREIGN PATENT DOCUMENTS

| | | | |
|---|---|---|---|
| CN | 1137614 | A | 12/1996 |
| CN | 1159555 | A | 9/1997 |
| DE | 764179 | | 4/1953 |
| DE | 3422398 | | 12/1985 |
| DE | 42 12 162 | | 10/1993 |
| EP | 0060315 | A1 | 9/1982 |
| EP | 0 085 246 | A | 8/1983 |
| EP | 0087818 | A2 | 9/1983 |
| EP | 0222109 | A1 | 5/1987 |
| EP | 0 281 317 | | 2/1988 |
| EP | 0309242 | A2 | 3/1989 |
| EP | 0403239 | A2 | 12/1990 |
| EP | 0482592 | | 4/1992 |
| EP | 0 747 597 | | 12/1996 |
| EP | 0777052 | A2 | 6/1997 |
| EP | 0814262 | A2 | 12/1997 |
| EP | 0871818 | A1 | 10/1998 |
| EP | 1 489 368 | A2 | 12/2004 |
| EP | 1515417 | A2 | 3/2005 |
| EP | 0 747 598 | A2 | 9/2005 |
| EP | 1 710 435 | A1 | 10/2006 |
| GB | 551304 | A | 2/1943 |
| GB | 654451 | A | 6/1951 |
| GB | 733 511 | A | 7/1955 |
| GB | 762110 | A | 11/1956 |
| GB | 889286 | A | 2/1962 |
| GB | 1054080 | A | 1/1967 |
| GB | 1248888 | A | 10/1971 |
| GB | 2043863 | A | 10/1980 |
| GB | 2116635 | | 9/1983 |
| GB | 2247543 | A | 3/1992 |
| GB | 2269246 | A | 2/1994 |
| GB | 2269684 | A | 2/1994 |
| JP | 54064711 | A | 5/1979 |
| JP | S57-162988 | | 4/1981 |
| JP | 57200685 | A | 12/1982 |
| JP | 57204381 | | 12/1982 |
| JP | 58106579 | U | 7/1983 |
| JP | 58151391 | U | 10/1983 |
| JP | 58195089 | A | 11/1983 |
| JP | S58-214644 | | 12/1983 |
| JP | 59145392 | | 8/1984 |
| JP | 62-003190 | | 6/1985 |
| JP | S61-107989 | | 7/1986 |
| JP | 62-003191 | | 1/1987 |
| JP | S62-29779 | | 2/1987 |
| JP | S62-125262 | | 6/1987 |
| JP | S62-125263 | | 6/1987 |
| JP | 63205478 | A | 8/1988 |
| JP | 63-138490 | | 9/1988 |
| JP | S61-138490 | | 9/1988 |
| JP | 63266178 | A | 11/1988 |

(56) References Cited

FOREIGN PATENT DOCUMENTS

| | | | |
|---|---|---|---|
| JP | 01200079 | | 8/1989 |
| JP | 2115577 | A | 4/1990 |
| JP | 02173369 | A | 7/1990 |
| JP | 02191882 | | 7/1990 |
| JP | 03138473 | | 6/1991 |
| JP | 3199677 | A | 8/1991 |
| JP | 04284194 | | 10/1992 |
| JP | 05164043 | | 6/1993 |
| JP | 05187357 | | 7/1993 |
| JP | 06093971 | A | 4/1994 |
| JP | 6 207602 | | 7/1994 |
| JP | 7190507 | | 7/1995 |
| JP | 07 190507 | A | 8/1995 |
| JP | 07-305906 | | 11/1995 |
| JP | H8-284842 | | 10/1996 |
| JP | 09280171 | | 10/1997 |
| JP | 10037863 | A | 2/1998 |
| JP | 2005256793 | A | 9/2005 |
| JP | 2008208757 | A | 9/2008 |
| WO | 8910768 | A1 | 11/1989 |
| WO | 9007683 | A1 | 7/1990 |
| WO | 9306423 | A1 | 4/1993 |
| WO | 2005/022053 | A1 | 3/2005 |

OTHER PUBLICATIONS

Office Action for European Patent Application No. 04028437.4, dated Jun. 30, 2008, 4 pp.
Office Action for European Patent Application No. 04028437.4, dated Nov. 9, 2009, 4 pp.
Office Action for European Patent Application No. 99306052.4, dated Dec. 16, 2003, 4 pp.
Office Action for European Patent Application No. 99306052.4, dated Aug. 13, 2004, 6 pp.
Office Action for European Patent Application No. 99306052.4, dated May 2, 2005, 8 pp.
Office Action for European Patent Application No. 99306052.4, dated Sep. 6, 2004, 2 pp.
Bitzer US Inc.'s Invalidity Contentions. *Emerson Climate Technologies, Inc.,* Plaintiff, v. *Bitzer US, Inc.,* Defendant. Civil Action No: 1:11-cv-00800-CAP, in the United States District Court for the Northern District of Georgia, Atlanta Division. Jul. 18, 2011.
Plaintiff's Infringement Contentions. *Emerson Climate Technologies, Inc.,* Plaintiff, vs. *Bitzer US, Inc.,* Defendant. Civil Action No: 1:11-cv-00800-CAP. In the United States District Court for the Northern District of Georgia, Atlanta Division. Jun. 13, 2011.
Bitzer's Response to Plaintiff's Infringement Contentions. *Emerson Climate Technologies, Inc.,* Plaintiff, v. *Bitzer US, Inc.,* Defendant. Civil Action No: 1:11-cv-00800-CAP. In the United States District Court for the Northern District of Georgia, Atlanta Division. Jul. 18, 2011.
Non-Final Office Action for U.S. Appl. No. 11/152,834, mailed Feb. 15, 2008.
Non-Final Office Action for U.S. Appl. No. 11/152,834, mailed Jan. 17, 2007.
International Preliminary Report on Patentability regarding International Application No. PCT/US2008/008939 dated Jan. 26, 2010.
International Search Report regarding International Application No. PCT/US2008/008939 dated Mar. 25, 2009.
Written Opinion of the International Searching Authority regarding International Application No. PCT/US2008/008939 dated Mar. 25, 2009.
International Search Report regarding International Application No. PCT/US2010/022230, dated Aug. 31, 2010.
Written Opinion of the International Searching Authority regarding International Application No. PCT/US2010/022230, dated Aug. 31, 2010.
European Search Report for Application No. EP 06 00 5929, dated Mar. 23, 2006.
Non-Final Office Action mailed May 27, 1999 for U.S. Appl. No. 08/939,779 (now U. S. Patent No. 6,047,557).
Non-Final Office Action mailed Aug. 1, 2001 for U.S. Appl. No. 09/524,364 (now U.S. Patent No. 6,408,635).
Final Office Action mailed Dec. 1, 2001 for U.S. Appl. No. 09/760,994 (now U.S. Patent No. 6,449,972).
Non-Final Office Action mailed Jun. 8, 2001 for U.S. Appl. No. 09/760,994 (now U.S. Patent No. 6,449,972).
Non-Final Office Action mailed Dec. 10, 2001 for U.S. Appl. No. 09/876,638 (now U.S. Patent No. 6,393,852).
Final Office Action mailed Aug. 10, 2007 for U.S. Appl. No. 10/730,492 (now U.S. Patent No. 7,389,649).
Non-Final Office Action mailed Jan. 30, 2007 for U.S. Appl. No. 10/730,492 (now U.S. Patent No. 7,389,649).
Non-Final Office Action mailed Jul. 11, 2006 for U.S. Appl. No. 10/730,492 (now U.S. Patent No. 7,389,649).
Non-Final Office Action mailed Feb. 22, 2006 for U.S. Appl. No. 10/730,492 (now U.S. Patent No. 7,389,649).
Final Office Action mailed Jun. 24, 2005 for U.S. Appl. No. 10/730,492 (now U.S. Patent No. 7,389,649).
Non-Final Office Action mailed Jan. 11, 2005 for U.S. Appl. No. 10/730,492 (now U.S. Patent No. 7,389,649).
Non-Final Office Action mailed Jul. 27, 2004 for U.S. Appl. No. 10/730,492 (now U.S. Patent No. 7,389,649).
Non-Final Office Action mailed May 7, 2009 for U.S. Appl. No. 11/529,645 (U.S. Pub. No. 2007/0022771).
Final Office Action mailed Dec. 30, 2008 for U.S. Appl. No. 11/529,645 (U.S. Pub. No. 2007/0022771).
Non-Final Office Action mailed Jul. 25, 2008 for U.S. Appl. No. 11/529,645 (U.S. Pub. No. 2007/0022771).
Final Office Action mailed Feb. 4, 2008 for U.S. Appl. No. 11/529,645 (U.S. Pub. No. 2007/0022771).
Non-Final Office Action mailed Aug. 13, 2007 for U.S. Appl. No. 11/529,645 (U.S. Pub. No. 2007/0022771).
Rejection Decision regarding CN200510064854.7 dated Feb. 6, 2009.
First Office Action dated Jul. 4, 2008 regarding Application No. 200610128576.1, received from the Patent Office of the People's Republic of China translated by CCPIT Patent and Trademark Law Office.
Second Office Action dated Apr. 17, 2009 regarding Application No. 200610128576.1 received from the Patent Office of the People's Republic of China translated by CCPIT and Trademark Law Office.
Notification of Second Office Action received from the Patent Office of the People's Republic of China dated May 5, 2009 regarding Application No. 200410085953.9, translated by CCPIT Patent and Trademark Office.
Extended European Search Report regarding Application No. EP 05016504 dated May 25, 2009.
Communication pursuant to Article 94(3) EPC received from the European Patent Office regarding Application No. 04 022920.5-2301 dated Jun. 15, 2009.
Third Office Action dated Aug. 21, 2009 regarding Application No. 200610128576.1 received from the Patent Office of the People's Republic of China translated by CCPIT and Trademark Law Office.
Patent Examination Report No. 1 for Patent Application No. 2012205211, dated Feb. 25, 2013.
Capacity Modulation for Air Conditioning and Refrigeration Systems; Air Conditioning, Heating & Refrigeration News; Earl B. Muir, Manager of Research, and Russell W. Griffith, Research Engineer, Copeland Corp.; Apr.-May 1979; 12 Pages.
Judgment—Bd.R. 127(b), *Jean-Luc Caillat* v. *Alexander Lifson*, Patent Interference No. 105,288; Jul. 5, 2005; 3 Pages.
Communication pursuant to Article 94(3) EPC is provided for App. No. EP 04 028 437.4.
Ashrae Handbook & Product Directory, 1979 Equipment, American Society of Heating, Refrigerating and Air-Conditioning Engineers, Inc., 1979, 6 Pages.
Maintenance Manual, Thermo King Corp., SB-III SR + uP IV +, 1995, 3 Pages.
Bitzer, Technical Information, Manual, 20 pages, KT-100-2, Bitzer International, Sindelfingen, Germany, Apr. 2002.
Non-final Office Action for U.S. Appl. No. 12/177,528, mailed Aug. 1, 2011.

(56) References Cited

OTHER PUBLICATIONS

Caillat's Annotated Claims regarding Interference No. 105,288, dated Mar. 16, 2005.
Caillat's Motion No. 3 regarding Interference No. 105,288.
Caillat's Motion No. 4 regarding Interference No. 105,288.
Declaration of Interference regarding Patent Interference No. 105,288, dated Feb. 16, 2005.
Curriculum Vitae of Richard L. Hall regarding Interference No. 105,288.
First Declaration of Richard L. Hall regarding Interference No. 105,288.
Response to Office Action regarding Reissue U.S. Appl. No. 09/921,334, dated Jul. 30, 2002.
Interference Initial Memorandum regarding Reissue U.S. Appl. No. 09/921,334, dated Jan. 31, 2005.
Notice of Opposition Against EP1515047, dated Jan. 26, 2012.
Appears to be an Annex Supporting Notice of Opposition Against EP1515047.
Complaint filed in the United States District Court for the Northern District of Georgia, Atlanta Division, Civil Action No. 1:11-cv-00800-CAP, *Emerson Climate Technologies, Inc.* v. *Bitzer US, Inc.,* filed Mar. 14, 2011.
Answer to Complaint and Counterclaims, Civil Action No. 1:11-cv-00800-CAP, *Emerson Climate Technologies, Inc.* v. *Bitzer US, Inc.,* filed Apr. 13, 2011.
Answer to Counterclaims, Civil Action No. 1:11-cv-00800-CAP, *Emerson Climate Technologies, Inc.* v. *Bitzer US, Inc.,* filed May 9, 0211.
Stipulation of Dismissal, Civil Action No. 1:11-cv-00800-CAP, *Emerson Climate Technologies, Inc.* v. *Bitzer US, Inc.,* filed Feb. 1, 2012.
Notice of Opposition: Bitzer Kuhlmaschinenbau GmbH, Opponent; Emerson Climate Technologies, Inc., Patent Proprietor; dated Jan. 18, 2012.
Translation of Annex 1 submitted with Notice of Opposition dated Jan. 18, 2012.
Annex 2 submitted with Notice of Opposition dated Jan. 18, 2012.
Annex 3 submitted with Notice of Opposition dated Jan. 18, 2012.
Annex 4 submitted with Notice of Opposition dated Jan. 18, 2012.
Annex 5 submitted with Notice of Opposition dated Jan. 18, 2012.
Annex 6 submitted with Notice of Opposition dated Jan. 18, 2012.
Annex 7 submitted with Notice of Opposition dated Jan. 18, 2012.
Annex 8 submitted with Notice of Opposition dated Jan. 18, 2012.
Annex 9 submitted with Notice of Opposition dated Jan. 18, 2012.
Annex 10 submitted with Notice of Opposition dated Jan. 18, 2012, with translation.
Translation of Annex 11 submitted with Notice of Opposition dated Jan. 18, 2012.

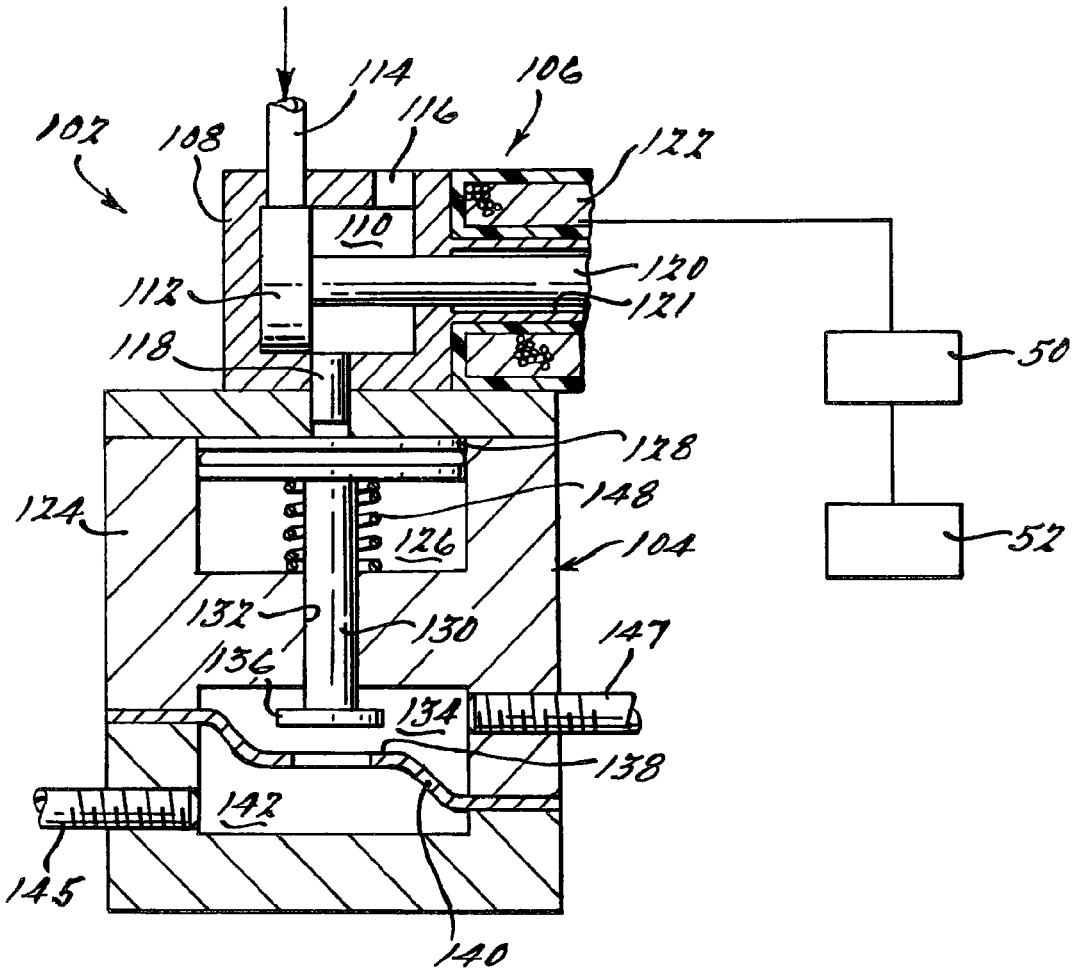
FIG. 9.
AMENDED

COMPRESSOR CAPACITY MODULATION

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,206,652. The reissue applications are application Ser. No. 11/152,834 (now U.S. Pat. No. RE40, 830) and Ser. No. 11/152,836 (the present application), all of which are reissue applications of U.S. Pat. No. 6,206,652.*

*The present application is a continuation-in-part of U.S. application Ser. No. 08/939,779 filed Sep. 29, 1997, which is now U.S. Pat. No. 6,047,557 issued Apr. 11, 2000.*

BACKGROUND AND SUMMARY OF THE INVENTION

The present invention is directed to a system for modulating the capacity of a positive displacement compressor such as a refrigeration and/or air conditioning compressor and more specifically to a system incorporating a valving arrangement for cyclically blocking suction gas flow to the compressor while the compressor is continuously driven.

Capacity modulation is often a desirable feature to incorporate in refrigeration and air conditioning compressors as well as compressors for other applications in order to enable them to better accommodate the wide range of loading to which systems incorporating these compressors may be subjected. Many different approaches have been utilized for providing this capacity modulation feature ranging from controlling of the suction inlet flow such as by throttling to bypassing discharge gas back to the suction inlet and also through various types of cylinder or compression volume porting arrangements.

In multicylinder reciprocating piston type compressors utilizing suction gas control to achieve capacity modulation, it is common to block the flow to one or more but not all of the cylinders. When activated, the capacity of the compressor will be reduced by a percentage nominally equal to the number of cylinders to which suction gas flow has been blocked divided by the total number of cylinders. While such arrangements do provide varying degrees of capacity modulation, the degree of modulation that can be achieved is available only in relatively large discrete steps. For example, in a six cylinder compressor, blocking suction to two cylinders reduces the capacity by ⅓ or 33.3% whereas blocking suction gas flow to four cylinders reduces capacity by ⅔ or 66.6%. This discrete step form of modulation does not allow the system capacity to be matched to the load requirement conditions at all but rather only to very roughly approach the desired capacity resulting in either an excess capacity or deficient capacity. As system conditions will rarely if ever match these gross steps of modulation, the overall operating system efficiency will not be able to be maximized.

Compressors in which discharge gas is recirculated back to suction offer quasi-infinite step modulation of the capacity depending upon the variation and complexity of the bypassing means. However, when discharge gas is recirculated back to suction, the work of compression is lost for that fraction of the gas recirculated thus resulting in reduced system efficiency. Combinations of the aforementioned methods enables substantially quasi-infinite capacity modulation at slightly better efficiency but still fails to provide the ability to closely match the compressor capacity to the load being served.

Other approaches, which can result in selectively disabling the compression process of one or more of the cylinders of a multi-cylinder compressor, such as cylinder porting, stroke altering or clearance volume varying methods result in similar step modulation with a resulting mismatch between load and capacity and additionally suffer from dynamic load unbalance and hence vibration.

The present invention, however, provides a capacity control arrangement which utilizes a pulse width modulation of suction gas flow to the compressor which enables substantially continuous modulation of the capacity from 0% up to 100% or full capacity. Thus the capacity output of the compressor can be exactly matched to system loading at any point in time. Further, in reciprocating piston type compressors, the suction gas flow to each of the cylinders may be controlled simultaneously by this pulse width modulation system so as to eliminate unbalanced operation of the compressor.

The pulse width modulated compressor is driven by a control system that supplies a variable duty cycle control signal based on measured system load. The controller may also regulate the frequency (or cycle time) of the control signal to minimize pressure fluctuations in the refrigerant system. The on time is thus equal to the duty cycle multiplied by the cycle time, where the cycle time is the inverse of the frequency.

The pulse width modulated compressor of the present invention has a number of advantages. Because the instantaneous capacity of the system is easily regulated by variable duty cycle control, an oversized compressor can be used to achieve faster temperature pull down at startup and after defrost without causing short cycling as conventional compressor systems would. Another benefit of the present invention is that the system can respond quickly to sudden changes in condenser temperature or case temperature set points. The controller adjusts capacity in response to disturbances without producing unstable oscillations and without significant overshoot. This capability is of particular advantage in applications involving cooling of display cases in that it allows a much tighter control of temperature within the case thereby enabling the temperature setting to be placed at a higher level without concern that cyclical temperature swings will exceed the temperatures which are considered safe for the particular goods contained therein.

Operating at higher evaporator temperatures reduces the defrost energy required because the system develops frost more slowly at higher temperatures. This also enables the time between defrost cycles to be lengthened.

The pulse width modulated compressor also yields improved oil return. The volume of oil returned to the compressor from the system is dependent in part on the velocity of gas flow to the compressor. In many capacity modulation systems, the return gas flow to the compressor is maintained at a relatively low level thus reducing the return oil flow. However, in the present invention the refrigerant flow pulsates between high capacity and low capacity (e.g. 100% and 0%), thus facilitating increased oil return due to the periods of high velocity gas flow.

Additionally, the pulse width modulated blocked suction system of the present invention is relatively inexpensive to incorporate into a compressor in that only a single valve assembly is required. Further, because of the system's simplicity, it can be easily added to a wide variety of compressor designs including both rotary and scroll as well as reciprocating piston type compressors. Also, because the present invention keeps the driving motor operating while the suction gas flow is modulated, the stress and strain on the motor resulting from periodic start-ups is minimized. Additional improvements in efficiency can be achieved by incorporating a motor control module which may operate to control various operating parameters thereof to enhance its operating efficiency during periods when the motor load is reduced due to unloading of the compressor.

Additional features and benefits of the present invention will become apparent to one skilled in the art from the following detailed description taken in conjunction with the appended drawings.

BRIEF DESCRIPTION OF THE DRAWINGS

FIG. 5 is a view similar to that of FIG. 1 but showing a rotary type compressor incorporating the pulse width modulation system of the present invention;

FIG. 6 is a section view of the compressor of FIG. 5, the section being taken along line 6-6 thereof;

DESCRIPTION OF THE PREFERRED EMBODIMENTS

Figure 1:
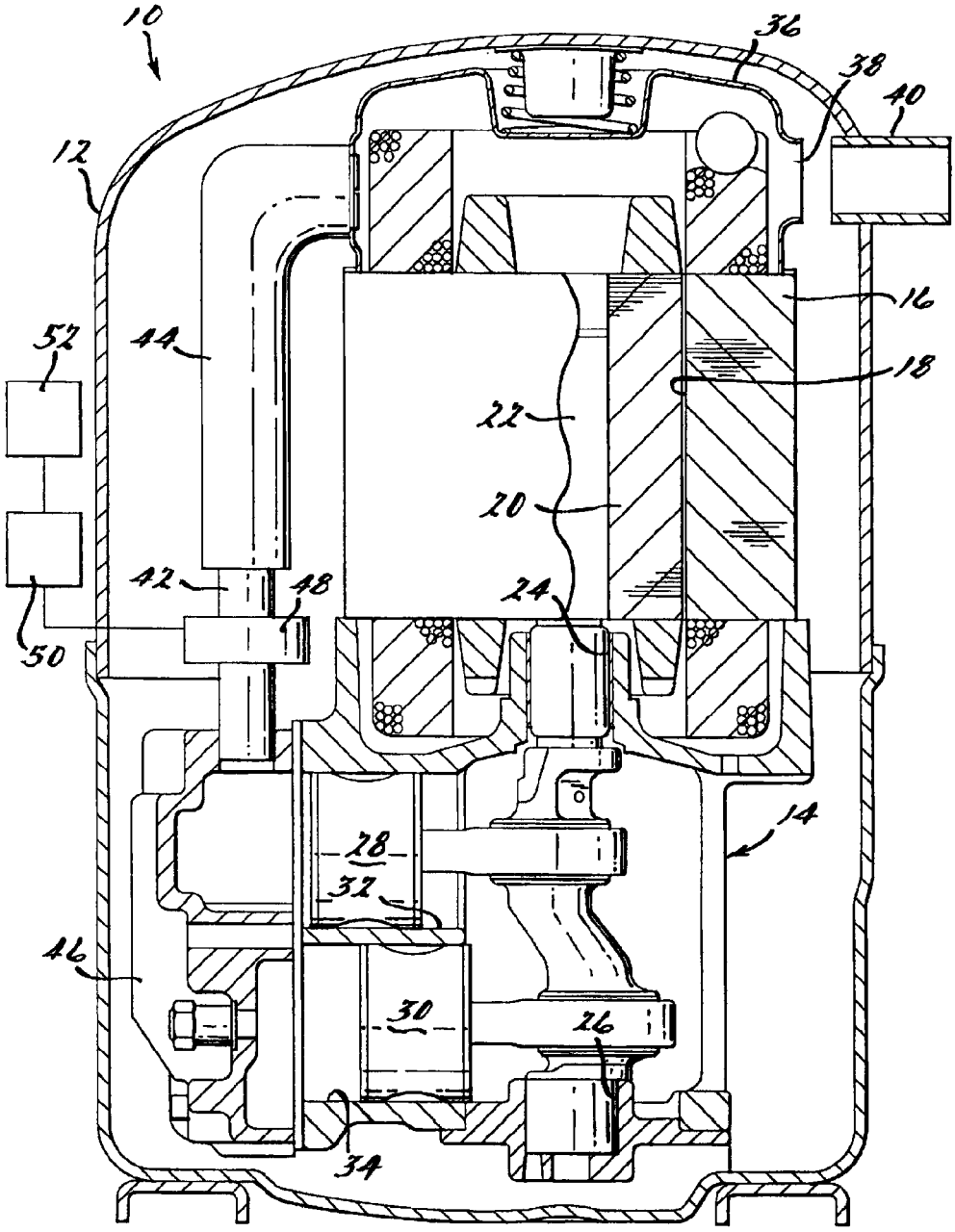
FIG. 1 is a section view of a reciprocating piston type compressor incorporating apparatus by which the suction gas flow to the compressor may be blocked in a pulse width modulated manner in accordance with the present invention.

Referring now to the drawings and more specifically to FIG. 1 there is shown a reciprocating piston type refrigeration compressor 10 comprising an outer shell 12 within which is disposed reciprocating compressor housing 14 on which is mounted an associated driving motor including stator 16 having a bore 18 provided therein. A rotor 20 is disposed within bore 18 being secured to crankshaft 22 which is rotatably supported within housing 14 by upper and lower bearings 24 and 26 respectively. A pair of pistons 28 and 30 are connected to crankshaft 22 and reciprocably disposed in cylinders 32 and 34 respectively. A motor cover 36 is secured in overlying relationship to the upper end of stator 16 and includes an inlet opening 38 aligned with a suction inlet fitting 40 provided through shell 12. A suction muffler 44 is provided on the opposite side of motor cover 36 and serves to direct suction gas from the interior of motor cover 36 to respective cylinders 32, 34 via suction pipe 42 and head assembly 46.

As thus far described, compressor 10 is a typical hermetic reciprocating piston type motor compressor and is described in greater detail in U.S. Pat. No. 5,015,155 assigned to the assignee of the present application, the disclosure of which is hereby incorporated by reference.

A bidirectional solenoid valve assembly 48 is provided in suction pipe 42 between suction muffler 44 and head assembly 46. Solenoid valve assembly operates to control suction gas flow through pipe 42 to thereby modulate the capacity of motor compressor 10. An exemplary valve assembly suitable for this application is described in greater detail below.

Figure 2:
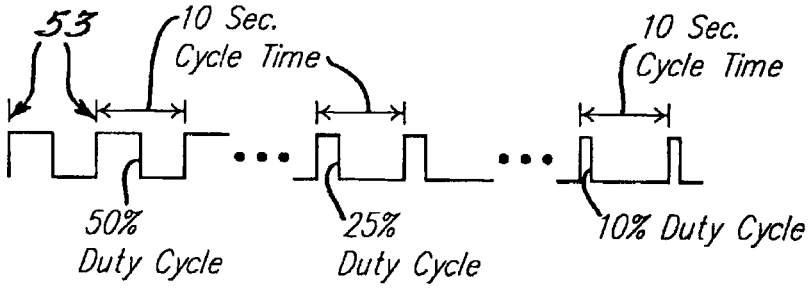
FIG. 2 is a waveform diagram illustrating the variable duty cycle signal produced by the controller and illustrating the operation at a constant frequency.
Figure 3:
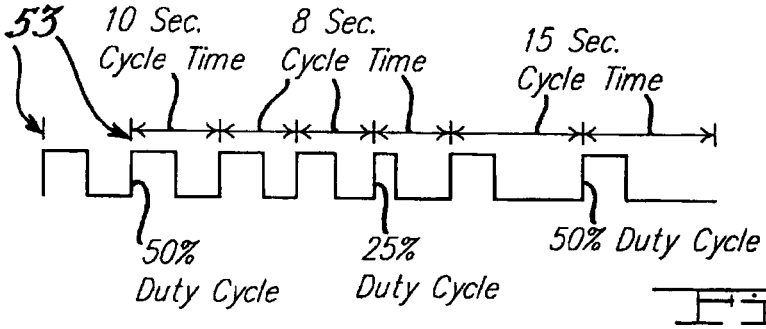
FIG. 3 is a waveform diagram of the variable duty cycle signal, illustrating variable frequency operation.

In order to control solenoid valve assembly 48, a control module 50 is provided to which one or more suitable sensors 52 are connected. Sensors 52 operate to sense operating system conditions necessary to determine system loading. Based upon signals received from sensors 52 and assuming system conditions indicate a less than full capacity is required, control module 50 will operate to pulse solenoid valve assembly 48 so as to alternately allow and prevent the flow of suction gas through conduit 42 to compression cylinders 32 and 34 while the motor continues to drive pistons 28 and 30. The variable duty cycle control signal generated by the control module 50 can take several forms. FIGS. 2 and 3 give two examples. FIG. 2 shows the variable duty cycle signal in which the duty cycle varies, but the frequency remains constant. In FIG. 2, note that the cycle time, indicated by hash marks 53, are equally spaced. By comparison, FIG. 3 illustrates the variable duty cycle signal wherein the frequency is also varied. In FIG. 3, note that the hash marks 53 are not equally spaced. Rather, the waveform exhibits regions of constant frequency, regions of increasing frequency and regions of decreasing frequency. The variable frequency illustrated in FIG. 3 is the result of the adaptive modulation of the cycle time to further optimize system operation. An adaptive modulation control system is described in greater detail in assignee's copending application Ser. No. 08/939,779 the disclosure of which is hereby incorporated by reference.

Given the speed of rotation of the compressor there would be a substantial number of compression cycles during which no suction gas would be supplied to the compression chambers. However thereafter there would be another number of compression cycles during which full suction gas flow would be supplied to the cylinders. Thus on average, the mass flow would be reduced to a desired percentage of full load capacity. Because the mass flow to each cylinder is reduced at the same time, the operating balance between the respective cylinders will be maintained thus avoiding the possibility of increased vibration. Further, this pulsed form of capacity modulation will result in alternating periods during which the driving motor is either operating at full load or substantially reduced loading. Thus it is possible to incorporate additional apparatus to vary one or more of the operating parameters of the motor during the reduce load period of operation thereby further improving system efficiency as discussed in greater detail below.

Figure 4:
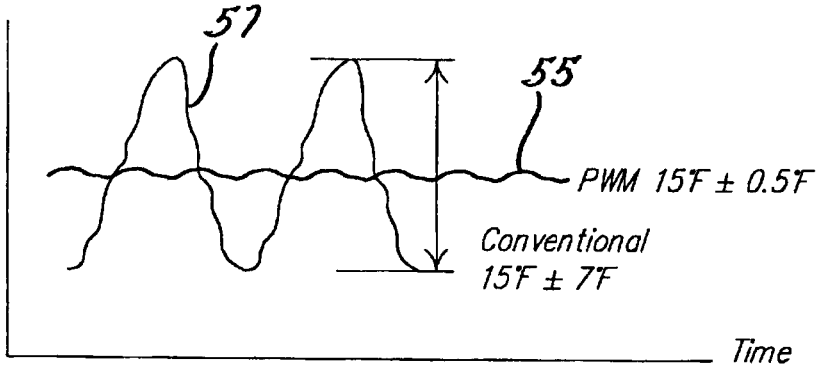
FIG. 4 is a graph comparing anticipated temperature dynamics of a system employing the invention with a system of conventional design.
Figure 3:
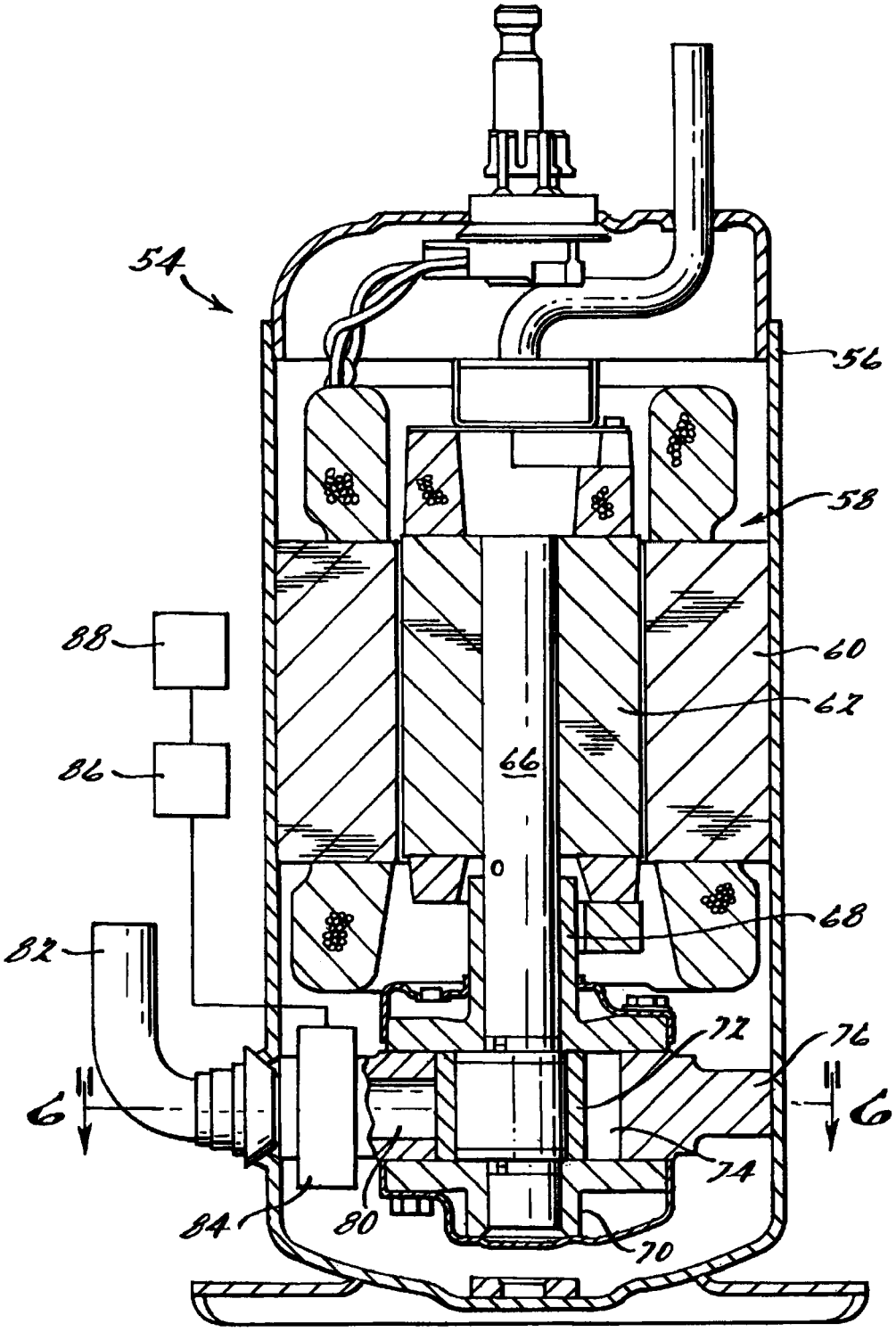

FIG. 4 graphically represents the benefits that the present invention may offer in maintaining tighter temperature control in a refrigerated storage case for example. Note how the temperature curve 55 of the invention exhibits considerably less fluctuation than the corresponding temperature curve 57 of a conventional controller.

It should be noted that valve assembly 48 will be activated between open and closed positions in a pulsed manner to provide the desired capacity modulation. Preferably, the cycle time duration will be substantially less than the time constant of the system load which typically may be in the range of about one to several minutes. In a preferred embodiment, the cycle time may be as much as 4 to 8 times less than the thermal time constant of the load or even greater. The thermal time constant of system may be defined as the length of time the compressor is required to run in order to enable the system to cool the load from an upper limit temperature at which the system is set to turn on, down to a point at which the evaporator pressure reaches a lower limit at which the compressor is shut down. More specifically, in a typical refrigeration system, flow of compressed fluid to the evaporator is controlled by a temperature responsive solenoid valve and operation of the compressor is controlled in response to evaporator pressure. Thus in a typical cycle, when the temperature in the cooled space reaches a predetermined upper limit, the solenoid valve opens allowing compressed fluid to flow to the evaporator to begin cooling the space. As the compressed fluid continues to flow to the evaporator and absorb heat, the pressure in the evaporator will increase to a point at which the compressor is actuated. When the temperature in the cooled spaces reaches a predetermined lower limit, the solenoid valve will be closed thereby stopping further flow of compressed fluid to the evaporator but the compressor will continue to run to pump down the evaporator. When the pressure in the evaporator reaches a predetermined lower limit, the compressor will be shut down. Thus, the actual running time of the compressor is the thermal time constant of the load.

By use of this pulse width modulated blocked suction system, it is possible to optimize compressor run times which minimizes the number of on/off cycles and provides excellent load capacity matching and superior temperature control for the area being cooled along with improved overall system efficiency as compared to conventional capacity modulation systems. As is illustrated in FIG. 4, the pulse width modulated capacity compressor of the present invention enables extremely tight control of temperature as compared to conventional capacity modulation systems. When applied to refrigeration systems, this tight temperature control enables the average operating temperature to be set at a level more closely approaching the upper acceptable temperature limit whereas with conventional systems, the average operating temperature must be set well below the upper acceptable temperature limit so as to avoid the larger temperature swings encountered therein from exceeding this upper acceptable limit. Not only does the use of a higher average operating temperature result in substantial direct energy cost savings but the higher average operating temperature maintains the dew point of the enclosed space at a higher level thus greatly reducing the formation of frost. Similarly, when applied to air conditioning systems, the pulse width modulated compressor of the present invention enables the temperature of the conditional space to be controlled within a much smaller range than with conventional systems thus greatly enhancing the comfort level of the occupants of such space. Even further, this capacity modulation system may also be advantageously applied to air compressor applications. Because of the ability of the compressor to very closely track the load (which in air compressor applications will be the volume of air being used at a desired pressure), it is possible to greatly reduce the size of the pressure vessel if not completely eliminate same. Further, in airconditioning applications additional energy savings may be realized because the compressor is able to very closely match the load. This results in lower condensing temperatures and hence pressures which means that the pressure against which the compressor is working is lower.

In most air conditioning and refrigeration compressors, the suction gas flow operates to cool the motor prior to compression. Because presently existing blocked suction type capacity modulation systems operate to prevent flow of suction gas to the compression chamber the compressor cannot be operated in a reduced capacity mode for an extended period without overheating of the compressor motor. The present invention, however, offers the additional advantage of greatly reducing this overheating possibility because the relatively cool suction gas is supplied to the cylinders on a rapidly cycling basis. This enables such compressors to operate at reduced capacity for substantially longer time periods thus also contributing to its ability to provide tighter temperature control of the spaces being cooled on a continuous basis as well as reduced frost build-up in low temperature refrigeration applications.

In determining the desired cycle frequency as well as the duration of the duty cycle or time period during which suction gas is to be supplied to the compressor, it is generally desirable to first select a cycle time which is as long as possible but yet minimizes suction pressure fluctuations. Next the duty cycle will be determined which will be sufficiently high so as to satisfy the load. Obviously, the duty cycle and cycle time are interrelated and other factors must also be taken into account in selection thereof. For example, while it is desirable to make the cycle time as long as possible, it can not be so long that the time period during which suction gas flow is interrupted results in excessive heating of the compressor motor.

While the capacity modulation system of the present invention has been described above with reference to a multicylinder reciprocating piston type compressor, it is also equally applicable to other types of compressors such as, for example, a rotary type compressor or a scroll compressor. A rotary type compressor incorporating the capacity modulation system of the present invention is illustrated in and will be described with reference to FIGS. 5 and 6 and a scroll compressor incorporating same is illustrated and will be described with reference to FIG. 7.

As shown in FIG. 5, a hermetic rotary type compressor 54 includes an outer shell 56 within which is disposed a compressor assembly and a driving motor 58 incorporating a stator 60 and rotor 62. Rotor 62 is rotatably supported by and fixed to crankshaft 66 which in turn is rotatably supported by upper and lower bearings 68 and 70. A compression rotor 72 is eccentrically mounted on and adapted to be driven by crankshaft 66. Compression rotor 72 is disposed within cylinder 74 provided in housing 76 and cooperates with vane 78 (*shown in FIG. 6*) to compress fluid drawn into cylinder 74 through inlet passage 80. Inlet passage 80 is connected to suction fitting 82 provided in shell 56 to provide a supply of suction gas to compressor 54. As thus far described, rotary compressor 54 is typical of rotary type refrigeration and air conditioning compressors.

In order to incorporate the pulse width capacity modulation system of the present invention into rotary compressor 54, a valve assembly 84 is provided being disposed within shell 56 and between suction fitting 82 and [suction gas flow path] *inlet passage* 80. Operation of valve assembly 84 is controlled by a control module 86 which receives signals from one or more sensors 88 indicative of the system operating conditions.

Operation of valve assembly 84, control module 86 and sensors 88 will be substantially identical to that described above with valve assembly 84 operating under the control of control module 86 to cyclically open and close to thereby modulate the flow of suction gas into cylinder 74. As with compressor 10, both the cycle frequency as well as the relative duration of the open and closed portions of the cycle may be varied by control module 86 in response to system operating conditions whereby the system efficiency may be maximized and the capacity varied to any desired capacity between zero and full load.

Figure 7:
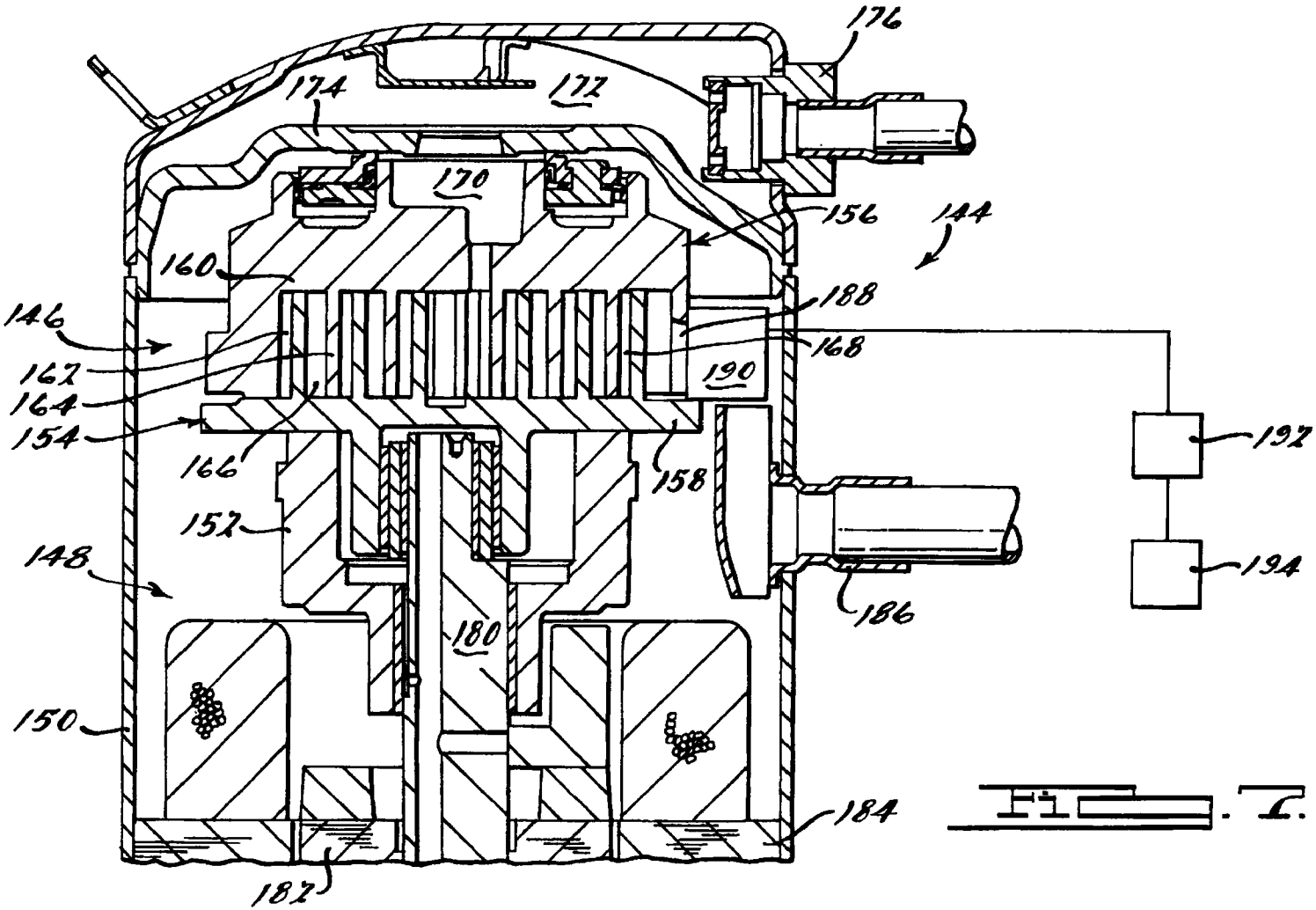
FIG. 7 is a view similar to that of FIGS. 1 and 5 but showing a scroll type compressor incorporating the pulse width modulation system of the present invention.

FIG. 7 shows a scroll type compressor 144 which includes a compressor assembly 146 and a driving motor 148 both disposed within hermetic shell 150.

Compressor assembly 146 includes a mean hearing housing 152 secured within and supported by outer shell 150, an orbiting scroll member 154 movably supported on bearing housing 152 and a nonorbiting scroll member 156 axially movably secured to bearing housing 152. Scroll members 154 and 156 each include end plates 158 and 160 from which interleaved spiral wraps 162 and 164 extend outwardly. Spiral wraps 162 and 164 together with end plates 158 and 160 cooperate to define moving fluid pockets 166, 168 which decrease in size as they move from a radially outer position to a radially inner position in response to relative orbital movement between scroll members 154 and 156. Fluid compressed within the moving fluid pockets 166, 168 is discharged through a centrally located discharge passage 170 provided in nonorbiting scroll member 156 into a discharge chamber 172 defined by the upper portion of hermetic shell 150 and muffler plate 174 and thereafter is supplied to the system via discharge fitting 176. An Oldham coupling is also provided acting between scroll members 154 and 156 to prevent relative rotation therebetween.

A drive shaft 180 is also provided being rotatably supported in bearing housing 152 and having one end thereof drivingly coupled to orbiting scroll member 154. A motor rotor 182 is secured to drive shaft 180 and cooperates with motor stator 184 to rotatably drive drive shaft 180. As thus far described, scroll compressor 144 is typical of scroll type compressors and will operate to draw fluid to be compressed flowing into hermetic shell 150 via inlet 186 into the moving fluid pockets via suction inlet 188 provided in nonorbiting scroll member 156, compress same and discharge the compressed fluid into discharge chamber 172.

In order to incorporate the pulse width capacity modulation system into scroll compressor 144, a valve assembly 190 is provided being positioned in overlying relationship to suction inlet 188 so as to be able to selectively control flow of fluid to be compressed into respective moving fluid pockets 166 and 168. Operation of valve assembly 190 is controlled by control module 192 in response to signals received from one or more sensors 194 in substantially the same manner as described above. It should be noted that while the present invention has been shown and described with reference to a scroll compressor in which the hermetic shell is substantially at suction pressure, it may also be easily incorporated in other types of scroll compressors such as those in which the interior is at discharge pressure or in which both scrolls rotate about radially offset axes.

As may now be appreciated, the pulsed capacity modulation system of the present invention is extremely well suited for a wide variety of compressors and is extremely effective in providing a full range of modulation at relatively low costs. It should be noted that if desired the pulsed capacity modulation system of the present invention may also be combined with any of the other known types of capacity modulation systems for a particular application.

In the above embodiments, it is intended that the compressor continue to be driven while in an unloaded condition. Obviously, the power required to drive the compressor when unloaded (no compression taking place) is considerably less than that required when the compressor is fully loaded. Accordingly, it may be desirable to provide additional control means operative to improve motor efficiency during these periods of reduced load operation.

Figure 8:
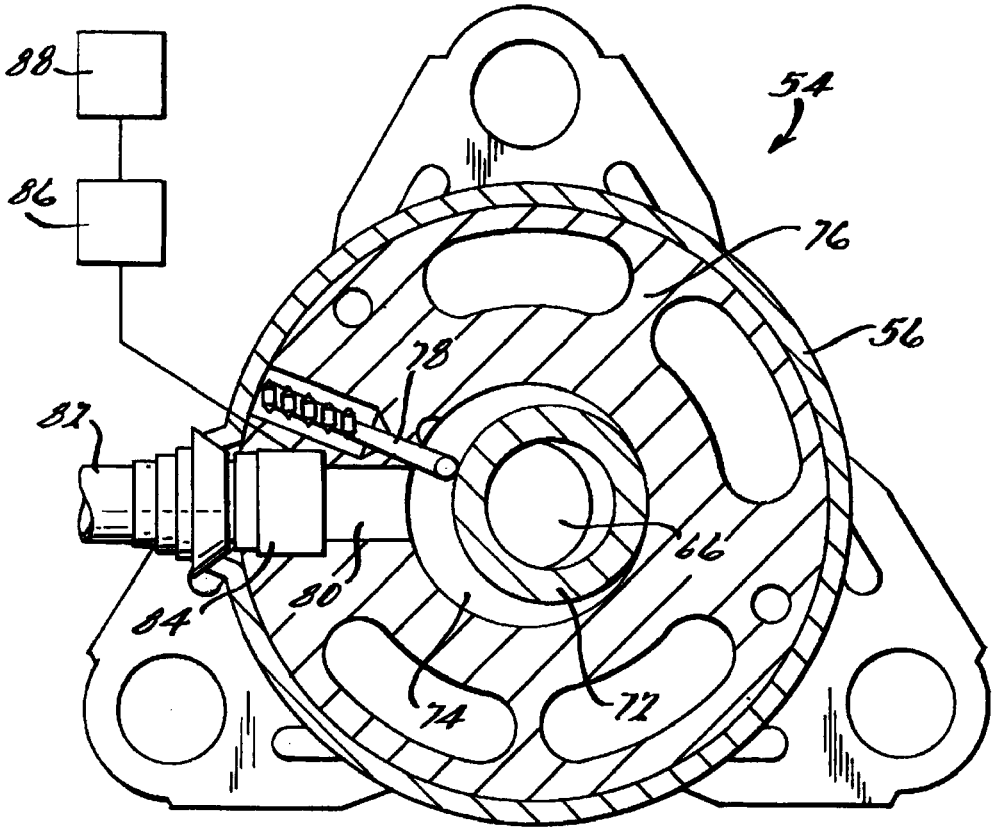
FIG. 8 is a schematic diagram illustrating the inclusion of a motor control module to modify one or more of the compressor motor operating parameters during periods of reduced load.

Such an embodiment is shown schematically in FIG. 8 which comprises a motor compressor 90 which may be of the type described above with respect to FIG. 1, FIGS. 5 and 6, or FIG. 7 and includes a solenoid valve assembly connected to a suction line which is operative to selectively block the flow of suction gas to the compressing mechanism. The solenoid valve assembly is intended to be controlled by a control module 92 in response to system conditions sensed by sensors 94. As thus far described, the system represents a schematic illustration of any of the embodiments described above. In order to improve efficiency of the driving motor during reduced load operation, a motor control module 96 is also provided which is connected to the compressor motor circuit via line 98 and to control module 92 via line 100. It is contemplated that motor control module 96 will operate in response to a signal from control module 92 indicating that the compressor is being placed in reduced load operating condition. In response to this signal, motor control module 96 will operate to vary one or more of the compressor motor operating parameters to thereby improve its efficiency during the period of reduced load. Such operating parameters are intended to include any variably controllable factors which affect motor operating efficiency including voltage reduction or varying the running capacitance used for the auxiliary winding of a single phase motor. Once control module 92 signals motor control module 96 that the compressor is being returned to fully loaded operation, motor control module 96 will then operate to restore the affected operating parameters to maximize motor efficiency under full load operation. There may be some time lag between the closing of the solenoid valve assembly and the reduced loading on the compressor which will be primarily dependent upon the volume of suction gas in the area between the solenoid valve assembly and the compression chamber. As a result, it may be desirable to provide for an appropriate time delay before the motor operating parameter is adjusted for the reduced loading. Of course, it is desirable that the solenoid valve assembly be positioned as close as possible to the compression chamber so as to minimize this delayed reaction time.

It should also be noted that while each of the embodiments has been described as incorporating a solenoid valve which operates to control the flow of pressurized discharge gas to the suction gas flow control valve for controlling suction gas flow, it is also possible to substitute other types of valves therefor such as, for example, solenoid valves by themselves or any other suitable valving arrangement. It is, however, believed that the use of a solenoid valve for controlling the flow of a pressurized fluid such as discharge gas to the suction control valve is preferred because it allows for application of greater actuating forces to the suction gas control valve and hence faster operation thereof. An exemplary embodiment of such a valve assembly is shown and will be described with reference to FIG. 9 it being noted that this valve assembly may be used in any of the embodiments described above.

Figure 9:
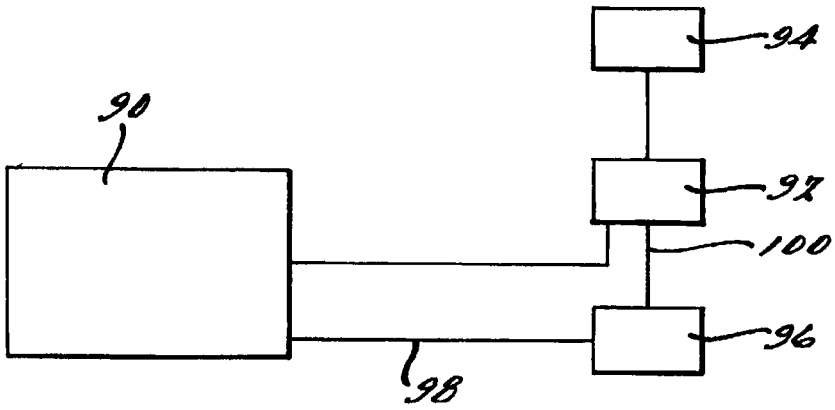
FIG. 9 is a section view generally illustrating a preferred valving arrangement for use in the present invention.

As shown in FIG. 9, valve assembly 102 comprises a solenoid control valve 106 and a pressure actuated valve 104.

Solenoid [valve assembly] *control valve* 106 includes a housing 108 within which is provided a valve chamber 110 having a valve member 112 movably disposed therein. A pressurized fluid supply line 114 opens into chamber 110 adjacent one end thereof and a vent passage 116 opens outwardly from chamber 110 adjacent the opposite end thereof. An outlet passage 118 is also provided opening into chamber 110 approximately midway between the opposite ends thereof. Valve member 112 is secured to one end of plunger 120 the other end of which extends axially movably along hermetically sealed bore 121 about which a solenoid coil 122 is positioned. As shown, plunger 120 will be biased into the position shown in which valve member 112 overlies and closes off pressurized fluid supply line 114 and outlet passage 118 is in open communication with vent passage 116. When solenoid coil 122 is energized, [shaft] *plunger* 120 will operate to move valve member 112 into a position in which it overlies and closes off vent passage 116 and allows open communication between pressurized fluid supply line 114 and outlet 118. The opposite end of pressurized fluid supply line *114* will be connected to a suitable source of pressurized fluid such as for example discharge gas from the compressor.

Pressure actuated valve assembly 104 includes a housing 124 having a cylinder 126 provided therein within which piston 128 is movably disposed. A shaft 130 has one end connected to piston 128 and extends from cylinder 126 through bore 132 into a chamber 134 provided in housing 124. A valve member 136 is secured to the end of shaft 130, is positioned within chamber 134 and is movable by shaft 130 into and out of sealing engagement with valve seat 138 provided on partition 140 so as to selectively control flow of suction gas from chamber 134 into chamber 142 and then through [outlet 144] *outlet 145*. An [inlet 146] *inlet 147* is provided for supplying suction gas to chamber 134.

Fluid outlet line 118 opens into one end of cylinder 126 and serves to provide pressurized fluid thereto to bias piston 128 in a direction such that valve 136 moves into sealing engagement with valve seat 138 to thereby interrupt the flow of suction gas from [inlet 146 to outlet 144] *inlet 147 to outlet 145*. A [return spring 148] *return spring 149* is [also] provided within cylinder 126 which serves to bias piston 128 in a direction so as to move valve member 136 out of sealing engagement with valve seat 138 in response to venting of the pressurized fluid from cylinder 126.

In operation, when control module 50 determines that capacity modulation is in order, it will operate to energize solenoid control valve 106 thereby moving valve 112 to the right as shown and allowing pressurized fluid to flow through chamber 110 to cylinder 126. This pressurized fluid then operates to move piston 128 in a direction to close valve 136 thereby preventing further flow of suction gas to the compression mechanism. When solenoid control valve 106 is deenergized by control module 50, valve 112 will move into [a] position to interrupt the supply of pressurized fluid to cylinder 126 and to vent same via passage 116 thereby enabling [return spring 148] *return spring 149* to move piston 128 in a direction to open valve member 136 such that the flow of suction gas to the compressor is resumed.

It should be noted that valve assembly 102 is exemplary only and any other suitable arrangement may be easily substituted therefor. As noted before, in order to facilitate rapid response to capacity modulation signals, it is desirable that the suction flow shut off valve be located as close to the compression chamber as possible. Similarly, the pressurized fluid supply line and vent passages should be sized relative to the volume of the actuating cylinder being supplied thereby to ensure rapid pressurization and venting of same.

It will be appreciated by those skilled in the art that various changes and modifications may be made to the embodiments discussed in this specification without departing from the spirit and scope of the invention as defined by the appended claims.

What is claimed is:

[1. A capacity modulated compressor comprising:

a compression mechanism having a compression chamber therein, a suction inlet for supplying suction gas to the compression chamber and a movable member operative to vary the volume of said compression chamber;

a power source operatively connected to effect movement of said movable member to thereby compress gas drawn into said compression chamber through said suction inlet;

a valve provided in the suction gas flow path to said compression mechanism, said valve being operable between open and closed positions to cyclically allow and prevent flow of suction gas into said compression chamber; and control apparatus for actuating said valve between said open and closed positions, said control apparatus being operative to cycle said valve such that its cycle time is substantially smaller than the time constant of the load on said compressor.]

[2. A capacity modulated compressor as set forth in claim 1 wherein said valve is positioned in close proximity to said compression chamber.]

[3. A capacity modulated compressor as set forth in claim 1 wherein said valve is a bidirectional valve.]

[4. A capacity modulated compressor as set forth in claim 1 wherein at least one of said cycle time and the time duration said valve is in said closed position is varied in response to sensed operating conditions.]

[5. A capacity modulated compressor as set forth in claim 4 wherein said power source continues to effect movement of said movable member as said valve is cycled between said open and closed positions.]

[6. A capacity modulated compressor as set forth in claim 4 wherein said cycle time and said time duration are varied in response to said sensed operating condition.]

[7. A capacity modulated compressor as set forth in claim 1 wherein said valve is actuated by pressurized fluid.]

[8. A capacity modulated compressor as set forth in claim 7 further comprising a control valve operative to control the flow of pressurized fluid to said valve.]

[9. A capacity modulated compressor as set forth in claim 8 wherein said control valve is a solenoid actuated valve.]

[10. A capacity modulated compressor as set forth in claim 7 wherein said pressurized fluid is supplied from said compression mechanism.]

[11. A capacity modulated compressor as set forth in claim 1 wherein said power source comprises an electric motor.]

[12. A capacity modulated compressor as set forth in claim 11 wherein said control module operates to vary an operating parameter of said electric motor when said valve is in said closed position so as to thereby improve the operating efficiency of said motor.]

[13. A capacity modulated compressor as set forth in claim 12 wherein said operating parameter of said motor is varied a predetermined time period after said valve is moved to said closed position.]

[14. A capacity modulated compressor as set forth in claim 1 wherein said compression mechanism is a reciprocating piston compressor.]

[15. A capacity modulated compressor as set forth in claim 14 wherein said reciprocating piston compressor includes a plurality of pistons and cylinders, said valve being operative to prevent flow of suction gas to all of said cylinders.]

[16. A capacity modulated compressor as set forth in claim 15 wherein said valve operates to prevent flow of suction gas to all of said cylinders simultaneously.]

[17. A capacity modulated compressor comprising:

a hermetic shell;

a compression mechanism disposed within said shell, said compression mechanism including a compression chamber defined in part by a moveable member, said moveable member operating to vary the volume thereof;

a drive shaft rotatably supported within said shell and drivingly coupled to said movable member;

a suction inlet passage for supplying suction gas to said compression chamber from a source remote from said shell;

a valve within said suction inlet passage, said valve being actuable between an open position to allow flow of suction gas through said inlet passage and a closed position to substantially prevent flow of suction gas through said inlet passage;

a controller for cyclically actuating said valve to an open position for first predetermined time periods and to a closed position for second predetermined time periods, the ratio of said first predetermined time period to the sum of said first and second predetermined time periods being less than a given load time constant and determining the percentage modulation of the capacity of said compressor.]

[18. A capacity modulated compressor as set forth in claim 17 wherein said valve is a bidirectional valve and is actuable to said closed position by pressurized fluid.]

[19. A capacity modulated compressor as set forth in claim 18 further comprising a solenoid valve actuable by said controller to control flow of said pressurized fluid to said valve.]

[20. A capacity modulated compressor as set forth in claim 19 wherein said pressurized fluid is discharge gas from said compressor.]

[21. A capacity modulated compressor as set forth in claim 17 wherein said valve is positioned in close proximity to said compression chamber.]

[22. A capacity modulated compressor as set forth in claim 17 wherein said compressor is a refrigeration compressor.]

[23. A capacity modulated compressor as set forth in claim 17 wherein said compressor is an air compressor.]

[24. A capacity modulated compressor as set forth in claim 17 wherein said compressor is a rotary compressor.]

[25. A capacity modulated compressor as set forth in claim 17 wherein said compressor is a scroll compressor.]

[26. A capacity modulated compressor as set forth in claim 17 wherein said sum of said first and second time periods is less than one half of said load time constant.]

[27. A capacity modulated compressor as set forth in claim 17 further comprising a motor for rotatably driving said drive shaft, said valve being actuable between said open and closed positions while said motor continues to rotatably drive said drive shaft.]

[28. A capacity modulated compressor as set forth in claim 27 wherein said controller operates to vary an operating parameter of said motor between periods in which said valve is in said closed position and in said open position to thereby improve the operating efficiency of said motor.]

[29. A method of modulating the capacity of a compressor forming a part of a cooling system to accommodate varying cooling load conditions comprising:

sensing an operating parameter of said cooling system, said parameter being indicative of the system load;

determining a cycle frequency of a maximum duration which will minimize variation in the suction pressure of refrigerant being supplied to said compressor;

determining a first time period during which suction gas will be supplied to said compressor and determining a second time period during which suction gas will be prevented from flowing to said compressor, said first and second time periods being equal to said cycle frequency; and pulsing a valve between open and closed positions for said first and second time periods respectively to thereby modulate the capacity of said compressor in response to said system operating parameter.]

*30. A capacity modulated compressor comprising:*

*a compression mechanism having a compression chamber therein, a suction inlet for supplying suction gas to the compression chamber and a movable member operative to vary the volume of said compression chamber;*

*a power source operatively connected to effect movement of said movable member to thereby compress gas drawn into said compression chamber through said suction inlet;*

*a valve provided in the suction gas flow path to said compression mechanism and actuated by pressurized fluid, said valve being operable between open and closed positions to cyclically allow and prevent flow of suction gas into said compression chamber; and*

*control apparatus for actuating said valve between said open and closed positions, said control apparatus being operative to cycle said valve such that its cycle time is substantially smaller than the time constant of the load on said compressor.*

*31. A capacity modulated compressor as set forth in claim 30 further comprising a control valve operative to control the flow of pressurized fluid to said valve.*

*32. A capacity modulated compressor as set forth in claim 31 wherein said control valve is a solenoid actuated valve.*

*33. A capacity modulated compressor as set forth in claim 30 wherein said pressurized fluid is supplied from said compression mechanism.*

*34. A capacity modulated compressor comprising:*

*a compression mechanism having a compression chamber therein, a suction inlet for supplying suction gas to the compression chamber and a movable member operative to vary the volume of said compression chamber;*

*an electric motor operatively connected to effect movement of said movable member to thereby compress gas drawn into said compression chamber through said suction inlet;*

*a valve provided in the suction gas flow path to said compression mechanism, said valve being operable between open and closed positions to cyclically allow and prevent flow of suction gas into said compression chamber; and*

*a control apparatus for actuating said valve between said open and closed positions, said control apparatus being operative to cycle said valve such that its cycle time is substantially smaller than the time constant of the load on said compressor and operable to vary an operating parameter of said electric motor when said valve is in said closed position so as to thereby improve the operating efficiency of said motor.*

*35. A capacity modulated compressor as set forth in claim 34 wherein said operating parameter of said motor is varied a predetermined time period after said valve is moved to said closed position.*

*36. A capacity modulated compressor comprising:*

*a hermetic shell;*

*a compression mechanism disposed within said shell, said compression mechanism including a compression chamber defined in part by a movable member, said movable member operating to vary the volume thereof;*

*a drive shaft rotatably supported within said shell and drivingly coupled to said movable member;*

*a suction inlet passage for supplying suction gas to said compression chamber from a source remote from said shell;*

*a valve within said suction inlet passage, said valve being actuable between an open position to allow flow of suction gas through said inlet passage and a closed position*

*to substantially prevent flow of suction gas through said inlet passage, said valve being a bidirectional valve actuable to said closed position by pressurized fluid; and*

*a controller for cyclically actuating said valve to an open position for first predetermined time periods and to a closed position for second predetermined time periods, the ratio of said first predetermined time period to the sum of said first and second predetermined time periods being less than a given load time constant, determining the percentage modulation of the capacity of said compressor.*

*37. A capacity modulated compressor as set forth in claim 36 further comprising a solenoid valve actuable by said controller to control flow of said pressurized fluid to said valve.*

*38. A capacity modulated compressor as set forth in claim 37 wherein said pressurized fluid is discharge gas from said compressor.*

*39. A capacity modulated compressor comprising:*

*a hermetic shell;*

*a compression mechanism disposed within said shell, said compression mechanism including a compression chamber defined in part by a movable member, said movable member operating to vary the volume thereof;*

*a drive shaft rotatably supported within said shell and drivingly coupled to said movable member;*

*a suction inlet passage for supplying suction gas to said compression chamber from a source remote from said shell;*

*a valve within said suction inlet passage, said valve being actuable between an open position to allow flow of suction gas through said inlet passage and a closed position to substantially prevent flow of suction gas through said inlet passage;*

*a controller for cyclically actuating said valve to an open position for first predetermined time periods and to a closed position for second predetermined time periods, the ratio of said first predetermined time period to the sum of said first and second predetermined time periods being less than a given load time constant, determining the percentage modulation of the capacity of said compressor; and*

*a motor for rotatably driving said drive shaft, said valve being actuable between said open and closed positions while said motor continues to rotatably drive said drive shaft;*

*wherein said controller operates to vary an operating parameter of said motor between periods in which said valve is in said closed position and in said open position to thereby improve the operating efficiency of said motor.*

*40. A method of modulating the capacity of a compressor forming a part of a cooling system to accommodate varying cooling load conditions comprising:*

*sensing an operating parameter of said cooling system, said parameter being indicative of the system load;*

*determining a cycle frequency of a maximum duration which will minimize variation in the suction pressure of refrigerant being supplied to said compressor;*

*determining a first time period during which suction gas will be supplied to said compressor and determining a second time period during which suction gas will be prevented from flowing to said compressor, said first and second time periods being equal to said cycle frequency; and*

*pulsing a valve between open and closed positions for said first and second time periods respectively to thereby modulate the capacity of said compressor in response to said system operating parameter.*

* * * * *